Aug. 5, 1924.
J. H. COOPER
1,503,638
ADJUSTABLE AUTOMOBILE LAMP
Filed Jan. 13, 1923
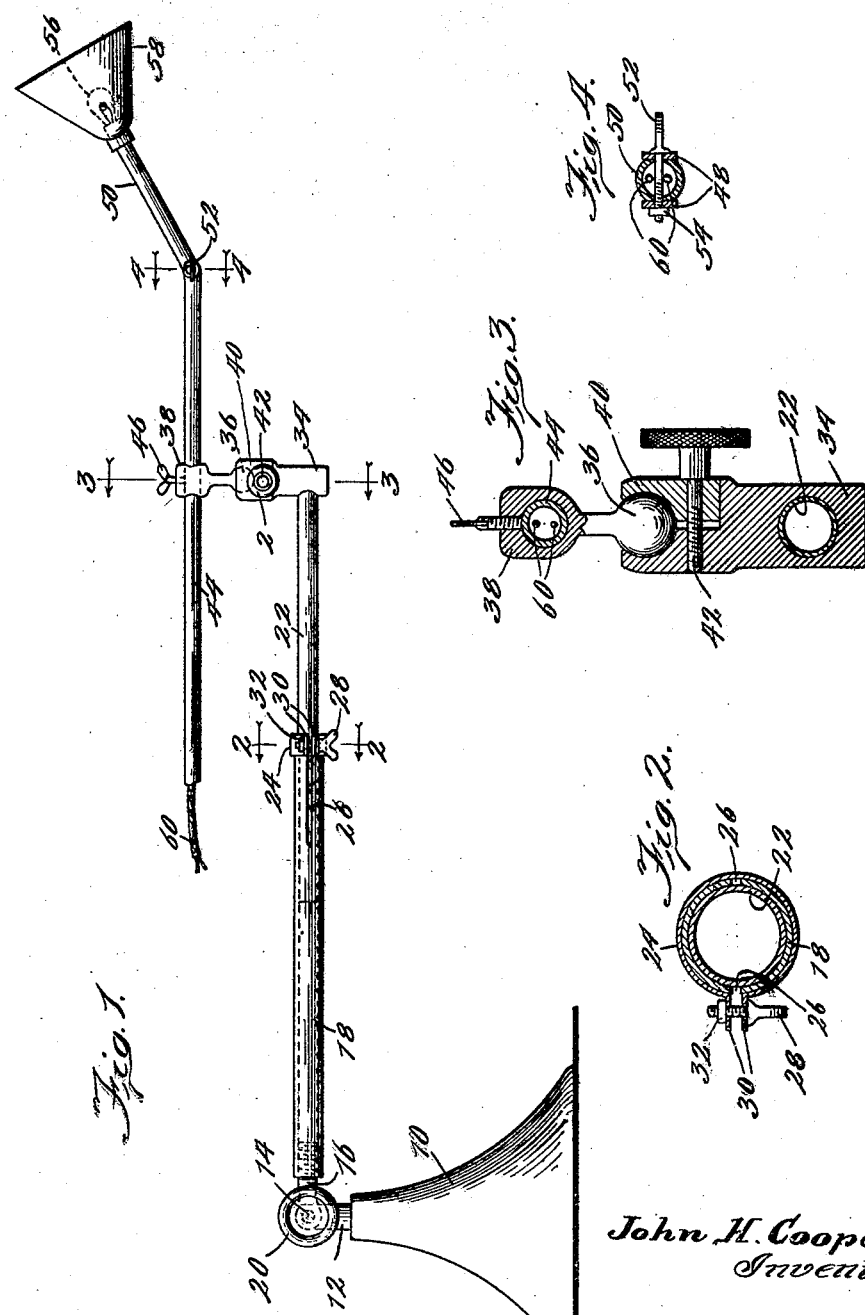
John H. Cooper,
Inventor:
By Mason Fenwick Lawrence
Attys.

Patented Aug. 5, 1924.

1,503,638

UNITED STATES PATENT OFFICE.

JOHN H. COOPER, OF MAYWOOD, ILLINOIS.

ADJUSTABLE AUTOMOBILE LAMP.

Application filed January 13, 1923. Serial No. 612,559.

*To all whom it may concern:*

Be it known that I, JOHN H. COOPER, a citizen of the United States, residing at Maywood, 514 St. Charles Road, in the county of Cook and State of Illinois, have invented certain new and useful Improvements in Adjustable Automobile Lamps; and I do hereby declare the following to be a full, clear, and exact description of the invention, such as will enable others skilled in the art to which it appertains to make and use the same.

This invention relates to improvements in adjustable automobile lamps, and has for its principal object the provision of such a lamp which can be readily used by a repairman, or any one else working upon an automobile, and which will be capable of universal adjustment, so that the light therefrom may be directed to any desired portion of the automobile with a minimum of trouble and inconvenience.

One of the principal objects of this invention is the provision of a lamp adapted to be used in connection with automobiles or the like, and which shall be capable of a wide range of adjustment, so that the lamp may be moved up or down, tilted or adjusted at an angle, and may also be extended through quite a considerable distance from its base so that the light from the lamp may be thrown directly upon the work in hand.

Another important object of the invention is the provision of an adjustable lamp, especially for automobile repair work, which lamp shall be mounted upon a suitable base sufficiently heavy to support the same in any desired position, said lamp being arranged on the end of telescoping extensions from said base which are capable of universal adjustment.

Still another important object of the invention is the provision of an adjustable trouble lamp or the like for automobiles, which shall be so constructed that the light can be thrown directly upon the part of the machine which is being worked on, and in close relation thereto, said lamp being provided with a shade, whereby the rays of the light are all directed forwardly upon the work, and will not be liable to shine into the eyes of the operator, which would cause annoyance and confusion.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved adjustable automobile lamp of this invention.

Figure 2 is a detail sectional view, taken on the line 2—2 of Figure 1.

Figure 3 is a section taken on the line 3—3 of Figure 1.

Figure 4 is a sectional view taken along the line 4—4 of Figure 1.

As shown in the drawings:

The reference numeral 10 indicates the base of the improved lamp of this invention, which base is preferably composed of heavy material, such as metal or the like, and is rather solid, so that the center of gravity of the device will always remain within the limits of this base, thereby insuring stability of the lamp, regardless of the position to which the same is adjusted.

It is obvious that the base may also be made of lighter material, and can be attached to some particular part of the garage or automobile repair shop, and the lamp itself extended therefrom, as will be clearly shown in the following description of the device.

A plug 12 is screw-threadedly mounted in the base 10 at the top thereof, and has attached thereto, by means of an axle or pin 14, a somewhat similar plug 16, which is likewise screwthreaded, and has mounted upon its free end a cylindrical tube or the like 18. A hand wheel 20, or other suitable adjusting means is provided in connection with the pin or axle 14 so that the relative position between the members 12 and 16 may be fixed by locking the hand wheel 20 into position in an obvious manner by screw threads, or the like, on the far end of the pin 14, which cooperate with a suitable nut or similar means.

Slidably mounted in the tube 18 is a bar or tube 22, and a locking means comprising a grip ring 24, is provided on the end of the tube 18, so that the same may be tightened into close contact with the tube 22. The end of the tube 18 is split, as shown at 26, and thereby adapted for the better cooperation of the gripping means 24 therewith. A winged bolt 28 passes through extensions 30 on the end of the gripping ring 24, and cooperates with a nut 32 in an obvious manner, to provide suitable locking means for the gripping ring 24.

Fixedly mounted upon the end of the tube 22 is a laterally extending head 34, having in its upper end a suitable socket for a ball 36 on the end of an arm 38, whereby a ball and socket joint connection is provided between the members 34 and 38. A suitable adjusting means is provided to lock the member 38 and the ball 36 into any desired position, or to arrange for a sliding frictional fit of the ball 36 in the member 34. This locking means comprises a detachable socket member 40, which is fitted to cooperate with the head 34, as shown in Figure 3, and adapted to be held in position thereon by means of a screw or the like 42, which serves as an adjusting means for drawing the member 40 into closer contact with the ball or head 36 of the member 38. The member 38 is provided at its upper end with a transverse cylindrical opening through which is adapted to pass a tube or cylinder 44, and a set screw 46 is provided to maintain the slidable tube 44 in any desired position with respect to the head or block 38.

The end of the tube 44 is forked, as best shown at 48 in Figure 4, and between these forked ends is fitted the end of a tube 50. A bolt 52 passes through both the forked ends 48 and the tube 50, said bolt having one end flattened to form a finger grip, the other end being screw threaded to cooperate with a nut 54. A lamp 56 is fitted upon the end of the tube 50, and has applied thereto a suitable shade 58. A current carrying cord or pair of wires 60 passes through the tubes 44 and 50 to the lamp 56.

The wide range of adjustability of this device will be readily apparent, as it can be so arranged to deliver light from the globe 56 at a height equal to the combined lengths of the tubes 44, 50 and 18, together with the height of the base 10, or at any desired height therebetween. The lateral range of the device is also very great, comprising a circle having as its radius the combined lengths of the tubes 18, 44 and 50, and the lamp 56 may be spaced at any desired point in the space included between the aforesaid height and the circular range just described. Further, the direction of the rays may be varied to accommodate the user throughout practically an indefinite number of directions, so that any part of an automobile or engine, or similar device, can be very readily illuminated for work thereon.

I am aware that many changes may be made, and numerous details of construction varied throughout a wide range without departing from the principles of this invention, and I, therefore, do not purpose limiting the patent granted hereon otherwise than as necessitated by the prior art.

I claim as my invention:

An adjustable automobile lamp comprising a base, a tube pivotally mounted on said base, a tube adapted to telescope said first-named tube, a head on the end of the second tube, a ball and socket joint in said head, a tube slidable in the universally mounted portion of said ball and socket joint, a cooperating tube pivotally mounted with respect to the tube mounted in the ball and socket joint member, and a lamp fixed on the end of said cooperating tube.

In testimony whereof I affix my signature.

JOHN H. COOPER.